United States Patent
Wu et al.

(10) Patent No.: US 11,060,952 B2
(45) Date of Patent: Jul. 13, 2021

(54) TEST DEVICE FOR TESTING HIGH-PRESSURE WATER TIGHTNESS FUNCTION OF PROFILED COMPONENTS

(71) Applicant: SUZHOU RS TECHNOLOGY CO., LTD., Suzhou (CN)

(72) Inventors: Jiafu Wu, Suzhou (CN); Lei Miao, Suzhou (CN)

(73) Assignee: SUZHOU RS TECHNOLOGY CO., LTD., Suzhou (CN)

( * ) Notice: Subject to any disclaimer, the term of this patent is extended or adjusted under 35 U.S.C. 154(b) by 166 days.

(21) Appl. No.: 16/486,821

(22) PCT Filed: Nov. 10, 2017

(86) PCT No.: PCT/CN2017/110398
§ 371 (c)(1),
(2) Date: Aug. 16, 2019

(87) PCT Pub. No.: WO2019/090667
PCT Pub. Date: May 16, 2019

(65) Prior Publication Data
US 2020/0232869 A1   Jul. 23, 2020

(51) Int. Cl.
*G01M 13/005*  (2019.01)
*G01M 3/02*  (2006.01)
*G01M 7/02*  (2006.01)
*G01M 7/04*  (2006.01)

(52) U.S. Cl.
CPC ............ *G01M 13/005* (2013.01); *G01M 3/02* (2013.01); *G01M 7/025* (2013.01); *G01M 7/027* (2013.01); *G01M 7/04* (2013.01)

(58) Field of Classification Search
CPC ........ G01M 3/02; G01M 7/025; G01M 7/027; G01M 7/04; G01M 13/005
USPC ............................................. 73/40, 41, 41.2
See application file for complete search history.

(56) References Cited

U.S. PATENT DOCUMENTS

| | | | | |
|---|---|---|---|---|
| 1,359,799 | A | * | 11/1920 | Gerhardt ............. G01M 3/3281 73/45.1 |
| 3,385,102 | A | * | 5/1968 | Briggs .................. G01M 3/202 73/40.7 |
| 3,391,635 | A | * | 7/1968 | Matheus ................. B41F 15/36 101/127.1 |

(Continued)

*Primary Examiner* — David A. Rogers
(74) *Attorney, Agent, or Firm* — Platinum Intellectual Property LLP (57) ABSTRACT

There is disclosed a test device for testing high-pressure water tightness function of profiled components, comprising a toggle mechanism comprising a drive assembly and a toggle assembly, the toggle assembly comprising a mounting seat drivingly connected to the drive assembly and several toggle levers mounted to the mounting seat; and a carrier stage configured to carry components to be tested; wherein each toggle lever is provided with a carrier stage directly below the toggle lever, the toggle lever is selectively mated to the component to be tested on the carrier stage, and the drive assembly can reciprocally transmit power along the X-axis direction, and when the toggle lever is in a mating state with the component to be tested on the carrier stage, the toggle lever reciprocated linearly along the X-axis direction under driving of the drive assembly to toggle the component to be tested on the carrier stage.

10 Claims, 8 Drawing Sheets

(56) References Cited

U.S. PATENT DOCUMENTS

| | | | | |
|---|---|---|---|---|
| 3,529,463 A * | 9/1970 | Kirchberger | H01M 10/4285 | 73/49.2 |
| 3,822,585 A * | 7/1974 | Toback | G01M 3/26 | 73/49.2 |
| 4,099,404 A * | 7/1978 | Eberle | G01M 3/3236 | 73/45.2 |
| 4,232,262 A * | 11/1980 | Emo | G01R 31/68 | 324/722 |
| 4,432,227 A * | 2/1984 | Dunn | G01M 3/2876 | 73/46 |
| 4,783,999 A * | 11/1988 | Kimball | G01M 7/04 | 384/12 |
| 5,083,463 A * | 1/1992 | Marshall | G01M 7/06 | 73/663 |
| 5,095,738 A * | 3/1992 | Roeschlaub | G01M 3/26 | 73/49.7 |
| 5,287,727 A * | 2/1994 | Nickerson, Jr. | G01M 3/02 | 73/37 |
| 5,435,533 A * | 7/1995 | Weinmann, Jr. | B25B 5/12 | 269/228 |
| 5,703,279 A * | 12/1997 | Igura | H01R 13/5219 | 73/40 |
| 5,777,484 A * | 7/1998 | Woith | G01R 31/2881 | 324/750.14 |
| 5,921,535 A * | 7/1999 | Lutz, III | B25B 5/12 | 269/228 |
| 6,279,383 B1 * | 8/2001 | Balke | G01M 3/2876 | 73/40 |
| 6,564,617 B1 * | 5/2003 | Araki | G01M 3/02 | 73/40 |
| 6,595,507 B2 * | 7/2003 | Dykstra | B25B 5/12 | 269/228 |
| 7,398,590 B1 * | 7/2008 | Mann | G11B 5/5582 | 29/603.03 |
| 7,900,898 B2 * | 3/2011 | Wampler, II | B23Q 3/069 | 269/152 |
| 8,689,612 B2 * | 4/2014 | Sleijpen | G01M 3/26 | 73/46 |
| 8,720,253 B2 * | 5/2014 | Nandwani | G01M 3/329 | 73/40 |
| 9,186,777 B2 * | 11/2015 | Woods | B25B 11/02 | |
| 9,696,236 B1 * | 7/2017 | Berto | G01M 7/027 | |
| 9,739,683 B2 * | 8/2017 | Kim | G08B 5/36 | |
| 9,835,518 B2 * | 12/2017 | Baek | G01M 7/027 | |
| 10,126,201 B2 * | 11/2018 | Van Wittenberghe | G01N 3/32 | |
| 10,213,808 B2 * | 2/2019 | Banning | D21F 1/18 | |
| 10,330,565 B2 * | 6/2019 | Lee | H01M 10/4285 | |
| 2007/0256478 A1 * | 11/2007 | Guadagnola | G01M 3/3254 | 73/40 |
| 2008/0034876 A1 * | 2/2008 | Crowson, II | G01M 7/04 | 73/668 |
| 2010/0154516 A1 * | 6/2010 | Hattori | G01M 3/329 | 73/40.7 |
| 2013/0074584 A1 * | 3/2013 | Graham | G01M 3/02 | 73/41 |
| 2015/0174615 A1 * | 6/2015 | Banning | F16F 7/1017 | 74/110 |
| 2016/0231195 A1 * | 8/2016 | Kim | G01M 3/02 | |
| 2017/0138816 A1 * | 5/2017 | Proulx | G01M 7/027 | |

* cited by examiner

TEST DEVICE FOR TESTING HIGH-PRESSURE WATER TIGHTNESS FUNCTION OF PROFILED COMPONENTS

TECHNICAL FIELD

The present invention relates to the field of tests for high-pressure water tightness function of components, and more particularly to a test device for testing high-pressure water tightness function of profiled components.

BACKGROUND

It is often necessary to test high-pressure water tightness function for some components after production completion and before leaving factory, for example, to test whether some mechanical performances and electrical performances meet designed requirements and product quality requirements.

In existing test devices for testing high-pressure water tightness function of components, most of them can only test water tightness function of components. The test devices often appear to be relatively limited when some mechanical performances of profiled components are to be tested because of complicated structure and shape. Therefore, the existing test devices for testing high-pressure water tightness function of components can only test one performance firstly. After that, the component is transferred to next carrier stage for another performance test. This greatly increases test time and component damage caused by repeated loading of components.

In view of this, it is necessary to develop a toggle mechanism of a test device for testing high-pressure water tightness function of profiled components to solve the above problems.

SUMMARY

In view of the deficiencies in the related art, it is an object of the present invention to provide a test device for testing high-pressure water tightness function of profiled components, which can test electrical performances of the profiled components under the high-pressure water environment, and can simultaneously test mechanical performances of the profiled components when toggled. The two tests are simultaneously performed, which greatly shortens test cycle, reduces component damage caused by repeated loading of components, increases test efficiency and reduces production costs.

To achieve the above mentioned object and other advantages of the present invention, there is provided a test device for testing high-pressure water tightness function of profiled components, comprising:

a toggle mechanism, the toggle mechanism comprising a drive assembly and a toggle assembly, the toggle assembly comprising a mounting seat drivingly connected to the drive assembly and several toggle levers mounted to the mounting seat; and a carrier stage configured to carry components to be tested;

wherein each toggle lever of the several toggle levers is provided with a carrier stage directly below the toggle lever, the toggle lever is selectively mated to the component to be tested on the carrier stage, and the drive assembly can reciprocally transmit power along the X-axis direction, and when the toggle lever is in a mating state with the component to be tested on the carrier stage, the toggle lever reciprocating linearly along the X-axis direction under the driving of the drive assembly to toggle the component to be tested on the carrier stage.

Preferably, the drive assembly comprises
a support, and
a drive motor and a sliding rail provided on the support;
wherein the sliding rail is slidably mated to a sliding seat, a power output end of the drive motor is connected with the sliding seat, and a front position sensor and a rear position sensor are provided at a side of the sliding seat for sensing a sliding position of the sliding seat.

Preferably, the mounting seat extends in a Y-axis direction, and the X-axis and the Y-axis are on the same horizontal plane and perpendicular to each other.

Preferably, a mounting plate is embedded in the mounting seat, and the extending direction of the mounting plate is consistent with the extending direction of the mounting seat.

Preferably, the carrier stage comprises:
a base which is provided with a connection portion protruding upward and an object stage for placing a component to be tested; and
a cover plate whose root portion is hinged to the connection portion, and the cover plate being provided with a relief hole passing through the upper and lower surfaces thereof;
wherein the cover plate can reciprocally rotate in a vertical plane around the connection portion to selectively press the component to be tested placed on the object stage, and when the cover plate is pressed against the component to be tested placed on the object stage, the upper portion of the component to be tested can pass through the relief hole.

Preferably, the object stage is provided with a receiving groove configured to receive the component to be tested, a detecting through hole extending in a vertical direction is provided at a bottom of the receiving groove, a probe is embedded in the detecting through hole, a sealing assembly is covered on the receiving groove, and the sealing assembly comprises
a sealing plate; and
a top sealing ring disposed between the sealing plate and the object stage;
wherein the sealing plate is provided with a sealing through hole for allowing the upper portion of the component to be tested to pass through, the top sealing ring is circumferentially disposed around the outer periphery of the receiving groove, and the sealing through hole communicates with the relief hole and the receiving groove, respectively.

Preferably, a ring of a buffer ring which is elastically contacted with the component to be tested is provided at an inner side of the sealing through hole, and the sealing plate, the top sealing ring and the buffer ring are all integrally formed as a unified whole.

Preferably, a pressing assembly for selectively pressing the cover plate is further provided at a side of the base, and the pressing assembly is disposed opposite to an end of the cover plate.

Preferably, the pressing assembly comprises:
a fixing seat;
a rotating shaft whose root portion is rotatably connected with the fixing seat; and
a pressing plate fixed to the top of the rotating shaft, wherein the pressing plate has an L-shaped structure.

Preferably, the front end of the toggle lever extends downward to form a lower extension portion, and a toggle groove is provided at the lower surface of the lower extension portion.

The present invention comprises at least the following beneficial effects compared to the related art:

1. Since the toggle lever reciprocates linearly along the X-axis direction under driving of the drive assembly to toggle the component to be tested on the carrier stage when the toggle lever is in a mating state with the component to be tested on the carrier stage, it is possible to test the mechanical performances of the component in a toggled state.

2. Since the object stage is provided with a receiving groove configured to receive the component to be tested, a detecting through hole extending in a vertical direction is provided at a bottom of the receiving groove, and a probe is embedded in the detecting through hole, the probe can perform electrical performance tests on the component to be tested in the receiving groove from the bottom of the receiving groove, which has a reasonable spatial structure layout, saves space and facilitates subsequent maintenances and adjustments.

3. Since the upper portion of the component to be tested can pass through the relief hole when the cover plate is pressed against the component to be tested placed on the object stage, the cover plate would not affect subsequent tests of the upper portion of the component to be tested after the component to be tested is pressed.

4. Since the sealing plate is provided with a sealing through hole allowing the upper portion of the component to be tested to pass through, the top sealing ring is circumferentially disposed around the outer periphery of the receiving groove, and the sealing through hole communicates with the relief hole and the receiving groove, respectively, the upper portion of the component to be tested placed in the receiving groove can be exposed after sequentially passing through the sealing through hole and relief hole, thereby facilitating tests of the upper portion of the component to be tested.

5. Since a ring of a buffer ring which is elastically contacted with the component to be tested is provided at an inner side of the sealing through hole, and the buffer ring can make the surface of the profiled component better fit the sealing plate in addition to providing better sealing, the problem that the component to be tested is shaken or misplaced in the receiving groove is reduced, and the outer surface of the component to be tested is also effectively protected.

6. Since a pressing assembly for selectively pressing the cover plate is further provided at a side of the base, and the pressing assembly is disposed opposite to an end of the cover plate, the sealing of the component to be tested is further improved.

DETAILED DESCRIPTION OF EMBODIMENTS

The present invention will be described in further detail with reference to the accompanying drawings below. The foregoing and other objects, features, aspects and advantages of the present invention will become more apparent, in order to enable person skilled in the art to practice with reference to the description. In the Figures, shapes and dimensions can be enlarged for clarity, and same or similar elements are indicated by same reference numerals throughout the Figures. In the following description, terms such as center, thickness, height, length, front, back, rear, left, right, top, bottom, upper, lower, etc. are based on the orientation or positional relationship shown in the drawings. In particular, "height" corresponds to the size from top to bottom, "width" corresponds to the size from left to right, and "depth" corresponds to the size from front to rear. These relative terms are for convenience of description and are generally not intended to require a particular orientation. Terms relating to attachment, coupling, etc. (e.g., "connected" and "attached") refer to a relationship in which these structures are directly or indirectly fixed or attached to each other through an intermediate structure, as well as a movable or rigid attachment or relationship, unless otherwise explicitly stated.

Figure 2:
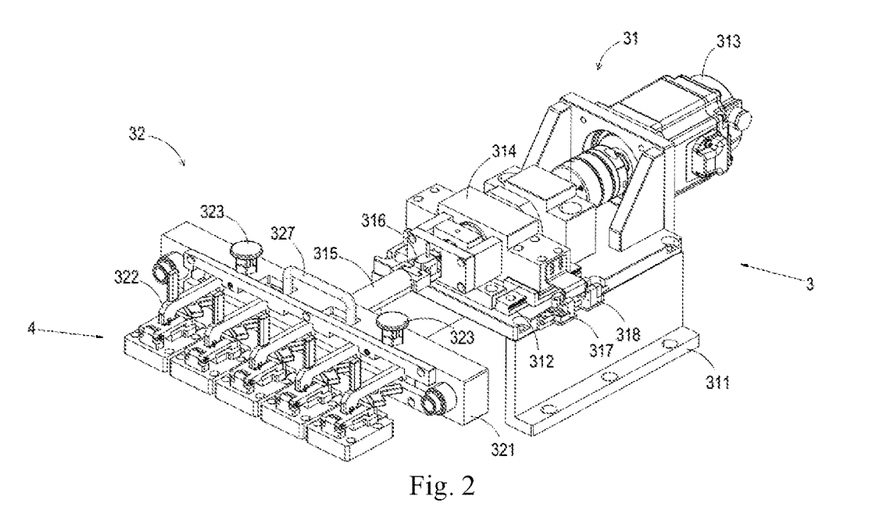
FIG. 2 is a stereogram of the test device for testing high-pressure water tightness function of profiled components according to another embodiment of the present invention.

As shown in FIG. 2, a test device for testing high-pressure water tightness function of profiled components, comprises: a toggle mechanism 3 and a carrier stage 4, where the toggle mechanism 3 comprises a drive assembly 31 and a toggle assembly 32, the toggle assembly 32 comprising a mounting seat 321 drivingly connected to the drive assembly 31 and several toggle levers 322 mounted to the mounting seat 321. The carrier stage 4 is configured to carry components to be tested. Each toggle lever 322 is provided with a carrier stage 4 directly below the toggle lever, the toggle lever 322 is selectively mated to the component to be tested on the carrier stage 4, and the drive assembly 31 can reciprocally transmit power along the X-axis direction. When the toggle lever 322 is in a mating state with the component to be tested on the carrier stage 4, the toggle lever 322 reciprocates linearly along the X-axis direction under the driving of the drive assembly 31 to toggle the component to be tested on the carrier stage 4. The mechanical performances of the components can be tested under the toggled state by employing the above structure.

Figure 1:
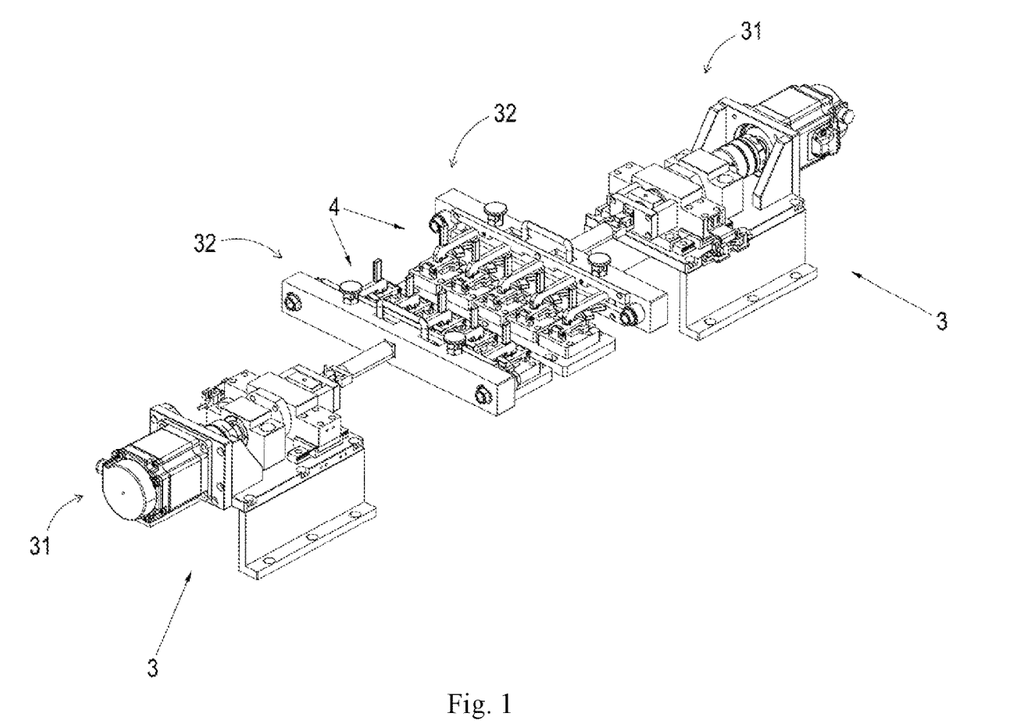
FIG. 1 is a stereogram of the test device for testing high-pressure water tightness function of profiled components according to one embodiment of the present invention.

As shown in FIG. 1, in a preferred embodiment, the toggle mechanism 3 is symmetrically provided with two sets, and each set of the toggle mechanism 3 is provided with five toggle levers 322. The number of the carrier stages 4 is in one-to-one correspondence with the number of the toggle levers 322.

Figure 5:
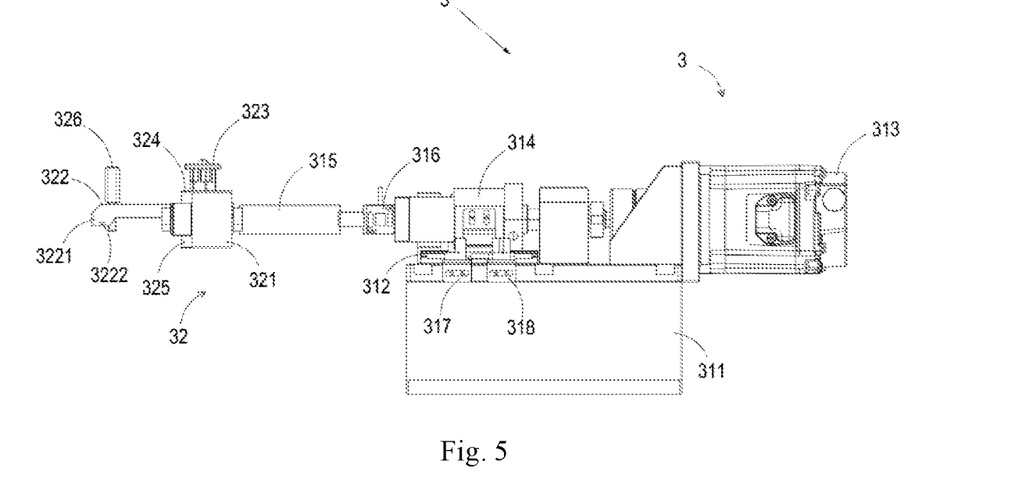
FIG. 5 is a right view of the toggle mechanism of the test device for testing high-pressure water tightness function of profiled components according to the present invention.

As shown in FIG. 5, the front end of the toggle lever 322 extends downward to form a lower extension portion 3221, and a toggle groove 3222 is provided at the lower surface of the lower extension portion 3221. Therefore, when the toggle lever 322 is being reciprocally toggled, other structures of the toggle lever 322 except the lower extension portion 3221 extending downward can perform avoidance to the profiled components, thereby preventing the test failure caused by collision.

Figure 3:
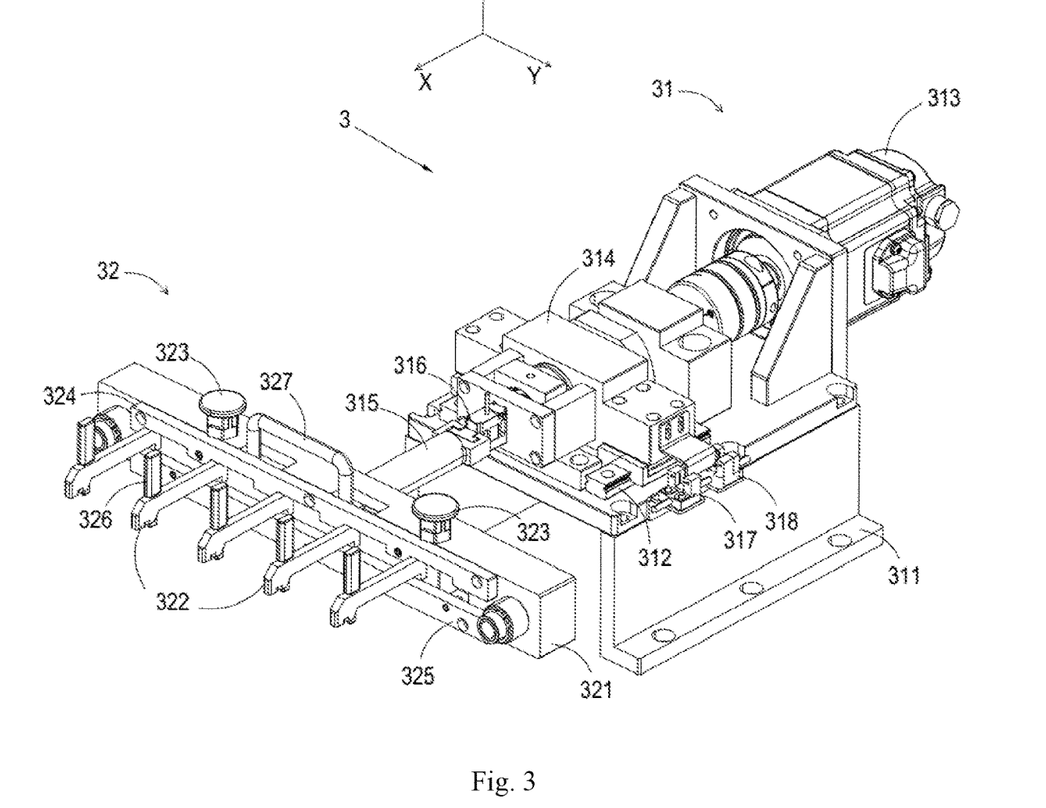
FIG. 3 is a stereogram of the test device for testing high-pressure water tightness function of profiled components according to the present invention when the toggle mechanism is at the station to be toggled.
Figure 4:
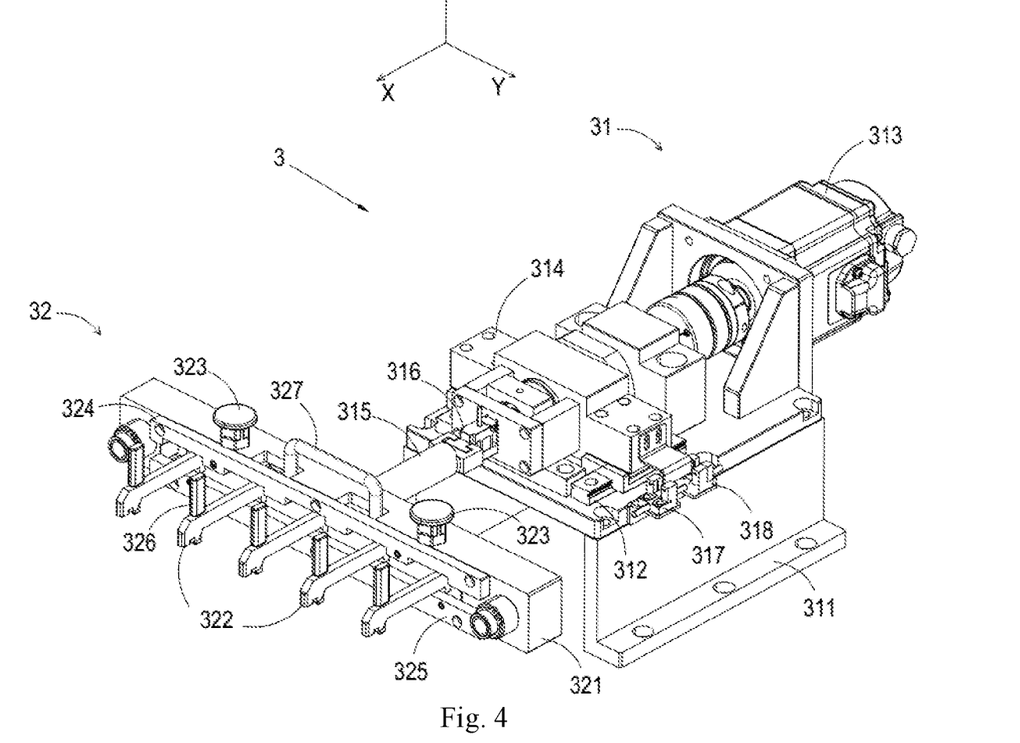
FIG. 4 is a stereogram of the test device for testing high-pressure water tightness function of profiled components according to the present invention when the toggle mechanism is at the toggling station.

As shown in FIG. 3 and FIG. 4, the mounting seat 321 extends in a Y-axis direction, and the X-axis and the Y-axis are on the same horizontal plane and perpendicular to each other.

Further, a mounting plate 328 is embedded in the mounting seat 321, and the extending direction of the mounting plate 328 is consistent with the extending direction of the mounting seat 321.

Further, several toggle levers 322 are fixed to the mounting plate 328 at equal intervals and parallel to each other, and the toggle lever 322 extends along the X-axis direction.

Figure 6:
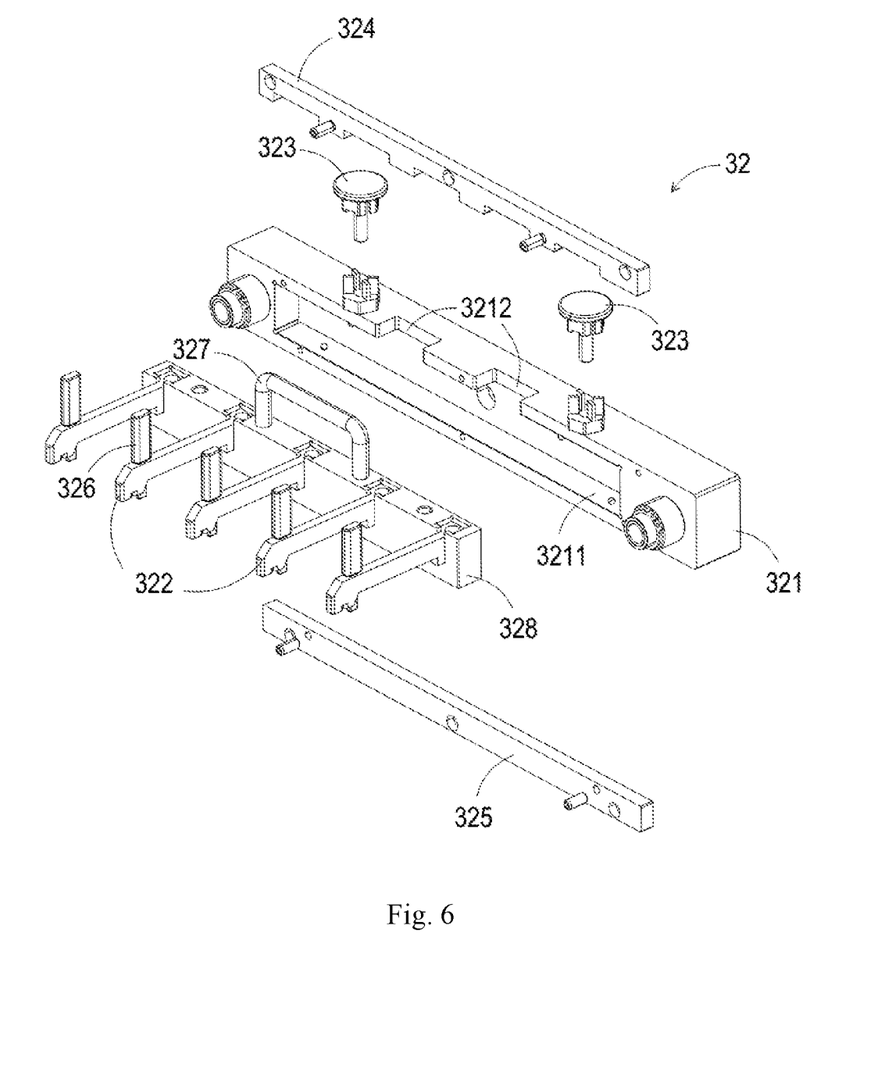
FIG. 6 is an exploded view of the toggle mechanism of the test device for testing high-pressure water tightness function of profiled components according to the present invention.

As shown in FIG. 6, a sliding slot 3211 for receiving the mounting plate 328 is formed in the mounting seat 321. The extending direction of the sliding slot 3211 is consistent with the extending direction of the mounting seat 321. The length of the sliding slot 3211 is greater than the length of the sliding slot 3211. Therefore, the mounting plate 328 can be selectively reciprocally slidable in the Y-axis direction in the sliding slot 3211, so that the toggle lever 322 can be switched from the station to be toggled in FIG. 3 to the toggling station in FIG. 4, When the toggle lever 322 is in the station to be toggled in FIG. 1, the toggle lever 322 is separated from the component to be tested, and the component on the carrier stage can be replaced at this time.

Further, a handle 327 is provided on the mounting plate 328. A relief groove 3212 is provided at a sidewall of the sliding slot 3211 at a corresponding position of the handle 327. Therefore, the operator can perform the switching between the station to be toggled and the toggling station by lifting the handle 327. In a preferred embodiment, the mounting seat 321 is further provided with a locking knob 323 selectively engaged with the mounting plate 328. Specifically, when the locking knob 323 is pressed down, the locking knob 323 is engaged with the mounting plate 328. At this time, the station where the mounting plate 328 is located is locked. When the locking knob 323 is pulled upward, the locking knob 323 is separated from the mounting plate 328, and the mounting plate 328 is in a free state. The station can be switched by lifting the handle 327. In another embodiment, an upper barrier strip 324 and a lower barrier strip 325 are disposed at the opening of the sliding slot 3211. The upper barrier strip 324 and the lower barrier strip 325 are respectively disposed at an upper end and a lower end of the opening for blocking the upper and lower portions of the mounting plate 328, which prevents the mounting plate 328 from slipping off the sliding slot 3211 and facilitates the stable mounting and sliding of the mounting plate 328 in the sliding slot 3211.

As shown in FIG. 3, a transmission rod 315 extending in the X-axis direction is connected between a power output end of the drive assembly 31 and the toggle assembly 32. A push-pull force sensor 316 is connected between the transmission rod 315 and the power output end of the drive assembly 31, and the push-pull force sensor 316 is used for sensing the pushing force exerted by the drive mechanism during the toggling process of the toggle lever 322.

As shown in FIG. 3 and FIG. 4, the drive assembly 31 comprises
a support 311, and
a drive motor 313 and a sliding rail 312 provided on the support 311;
where the sliding rail 312 is slidably mated to a sliding seat 314, the power output end of the drive motor 313 is connected with the sliding seat 314, and a front position sensor 317 and a rear position sensor 318 are provided at a side of the sliding seat 314 for sensing a sliding position of the sliding seat 314.

Figure 7:
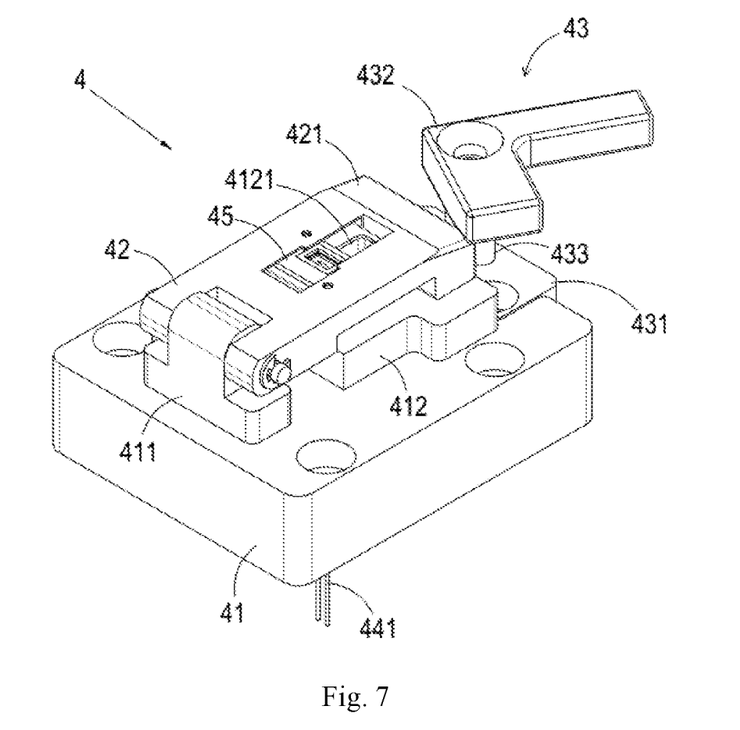
FIG. 7 is a stereogram of the carrier stage of the test device for testing high-pressure water tightness function of profiled components according to the present invention.
Figure 8:
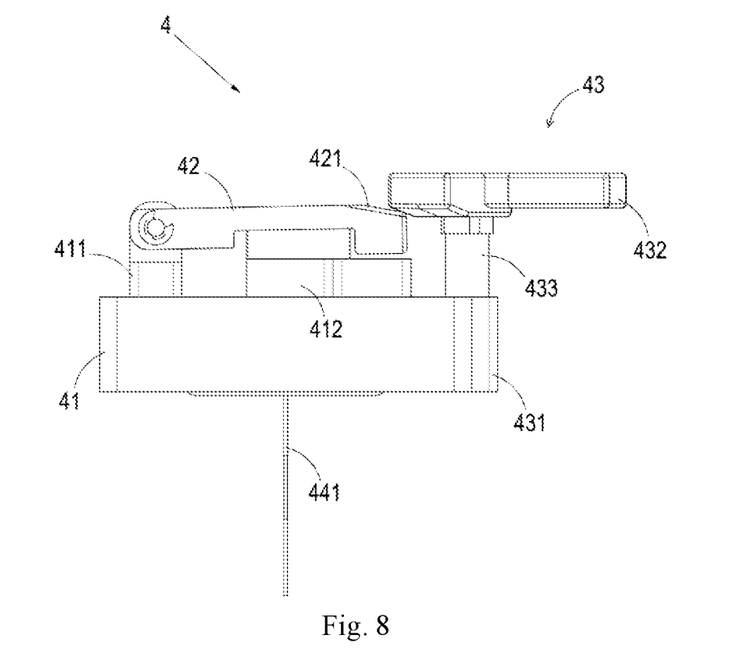
FIG. 8 is a right view of the carrier stage of the test device for testing high-pressure water tightness function of profiled components according to the present invention.
Figure 9:
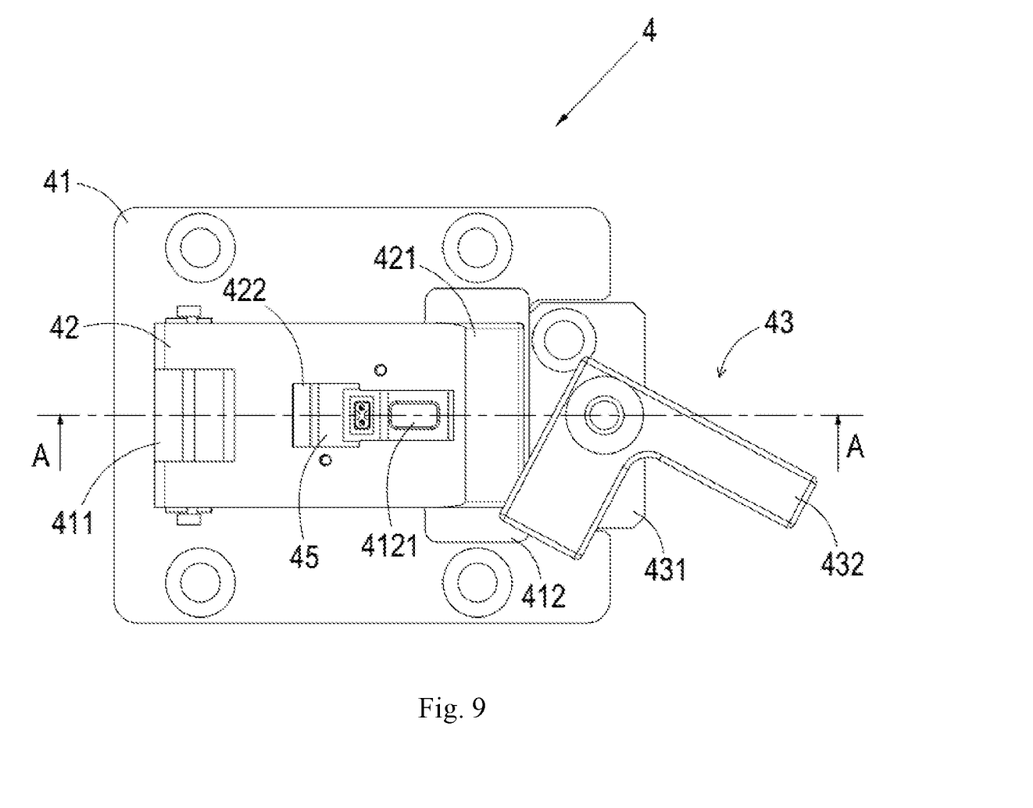
FIG. 9 is a top view of the carrier stage of the test device for testing high-pressure water tightness function of profiled components according to the present invention.

As shown in FIG. 7 and FIG. 8, the carrier stage 4 comprises: a base 41 and a cover plate 42, where the base 41 is provided with a connection portion 411 protruding upward and an object stage 412 for placing a component to be tested; the cover plate 42 has a root portion hinged to the connection portion 411, and the cover plate 42 is provided with a relief hole 422 passing through the upper and lower surfaces thereof. The cover plate 42 can reciprocally rotate in a vertical plane around the connection portion 411 to selectively press the component to be tested placed on the object stage 412. When the cover plate 42 is pressed against the component to be tested placed on the object stage 412, the upper portion of the component to be tested can pass through the relief hole 422. Therefore, the cover plate 42 will not affect subsequent tests of upper portion of the component to be tested after the component to be tested is pressed.

Figure 11:
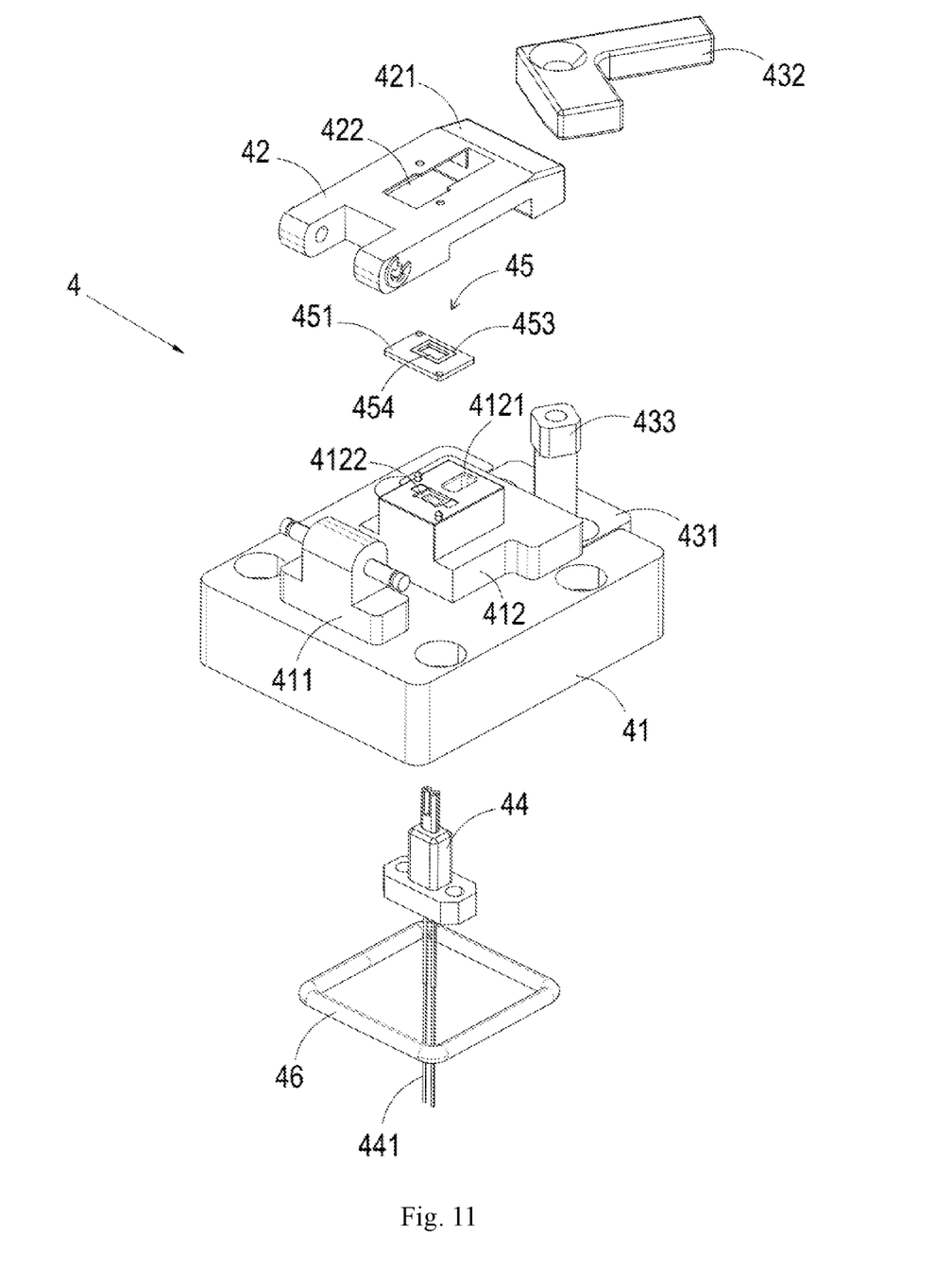
FIG. 11 is an exploded view of the carrier stage of the test device for testing high-pressure water tightness function of profiled components according to the present invention.

As shown in FIG. 11, the object stage 412 is provided with a receiving groove 4122 for receiving the component to be tested.

Further, a detecting through hole extending in a vertical direction is provided at a bottom of the receiving groove 4122, and a probe 44 is embedded in the detecting through hole 4122. Therefore, the probe can test the component to be tested from below, which has a reasonable spatial structure layout, saves space and facilitates subsequent maintenances and adjustments. In a preferred embodiment, a wire drawn from the bottom of the probe exits from below the base 41. In another embodiment, the object stage 412 is further provided with an adjustment positioning hole 4121. In a preferred embodiment, the toggle lever 322 is removably embedded with a positioning pin 326 that extends in a vertical direction. The positioning pin 326 is used for adjusting the matching position (e.g., perpendicularity and parallelism) between the toggle lever 322 and the component to be tested, which can facilitate the fine adjustment of the positional relationship between the two, improve the test accuracy, and improve the convenience of assembly and adjustment of the operator.

Figure 10:
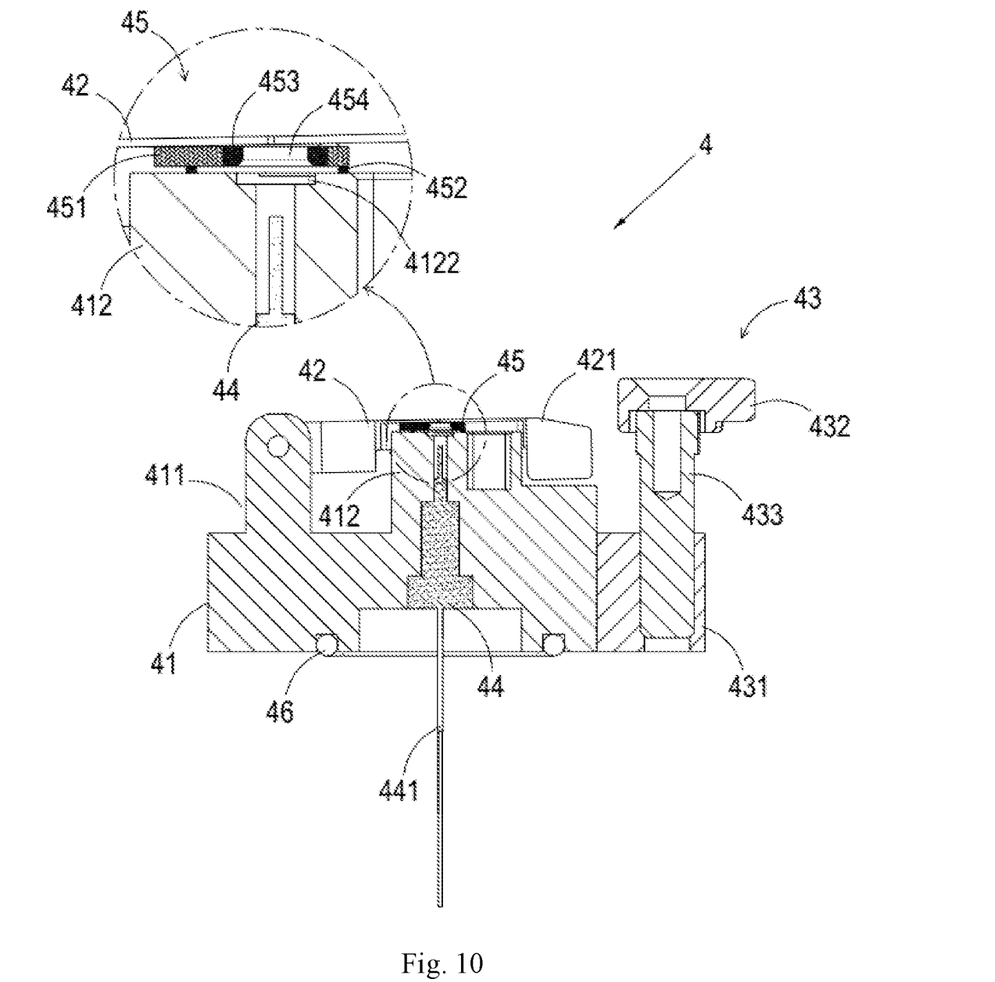
FIG. 10 is a cross-sectional view along the A-A direction in FIG. 9.

As shown in FIG. 10, a sealing assembly 45 is covered on the receiving groove 4122, and the sealing assembly 45 comprises:
a sealing plate 451, and
a top sealing ring 452 disposed between the sealing plate 451 and the object stage 412;
where the sealing plate 451 is provided with a sealing through hole 454 for allowing the upper portion of the component to be tested to pass through, the top sealing ring 452 is circumferentially disposed around the outer periphery of the receiving groove 4122, and the sealing through hole 454 communicates with the relief hole 422 and the receiving groove 4122, respectively. Therefore, the upper portion of the component to be tested placed in the receiving groove 4122 can be exposed after sequentially passing through the sealing through hole 454 and the relief hole 422, thereby facilitating testing of the upper portion of the component to be tested while sealing the lower portion thereof.

Further, a ring of a buffer ring 453 which is elastically contacted with the component to be tested is provided at the inner side of the sealing through hole 454 and the sealing plate 451, the top sealing ring 452 and the buffer ring 453 are all integrally formed as a unified whole. The buffer ring 453 can make the surface of the profiled components better fit the sealing plate 451 in addition to providing better sealing, thereby reducing the problem that the component to be tested is shaken and misplaced in the receiving groove 4122, and also effectively protecting the outer surface of the component to be tested.

As shown in FIG. 7 and FIG. 8, a pressing assembly 43 for selectively pressing the cover plate 42 is further provided at a side of the base 41 and the pressing assembly 43 is disposed opposite to an end of the cover plate 42.

Further, the pressing assembly 43 comprises:
a fixing seat 431;
a rotating shaft 433 whose root portion is rotatably connected with the fixing seat 431; and
a pressing plate 432 fixed to the top of the rotating shaft 433,
where the pressing plate 432 has an L-shaped structure. The pressing plate 432 can selectively press the cover plate 42 during rotation process. In a preferred embodiment, the upper surface of the end of the cover plate 42 is provided with a downwardly inclined guiding slope 421, which can change the point contact between the pressing plate 432 and the cover plate 42 into surface contact. Therefore, the contact pressure between the two tends to be alleviated, reducing the wear between the two after long time and multiple tests, and improving the service life.

As shown in FIG. 11, a bottom sealing ring 46 is embedded at the bottom of the base 41, and the bottom sealing ring 46 is circumferentially disposed around the outer circumference of the detecting through hole. Therefore, the lower portion of the probe 44 can be sealed to prevent test failure caused by water intrusion from the bottom of the base 41 to the detecting through hole under high pressure state.

The number of devices and processing scales described herein are intended to simplify the description of the present invention. Applicability, modifications, and variations of the present invention will be apparent to the person skilled in the art.

Although embodiments of the present invention have been disclosed as above, they are not limited to the implementations listed in the specification and embodiments. They can be applied to all kinds of fields suitable for the present invention. Additional modifications can be easily implemented to those who are familiar with the field. Therefore, the present invention is not limited to specific details and the legends shown and described herein without deviation from the general concepts defined in the claims and the equivalents thereof.

What is claimed is:

1. A test device for testing water tightness function of profiled components, being characterized in that it comprises:
a toggle mechanism, the toggle mechanism comprising a chive assembly and a toggle assembly, the toggle assembly comprising a mounting seat drivingly connected to the drive assembly and several toggle levers mounted to the mounting seat; and
a carrier stage configured to carry components to be tested;
wherein each toggle lever of the several toggle levers is provided with a carrier stage directly below the toggle lever, the toggle lever is selectively mated to the component to be tested on the carrier stage, and the drive assembly can reciprocally transmit power along the a X-axis direction, and when the toggle lever is in a mating state with the component to be tested on the carrier stage, the toggle lever reciprocating linearly along a X-axis direction under driving of the drive assembly to toggle the component to be tested on the carrier stage.

2. The test device for testing water tightness function of profiled components according to claim 1, being characterized in that, the drive assembly comprises
a support, and
a drive motor and a sliding rail provided on the support;
wherein the sliding rail is slidably mated to a sliding seat, a power output end of the drive motor is connected with the sliding seat, and a front position sensor and a rear position sensor are provided at a side of the sliding seat for sensing a sliding position of the sliding seat.

3. The test device for testing water tightness function of profiled components according to claim 1, being characterized in that, the mounting seat extends in a Y-axis direction, and the X-axis and the Y-axis are on the same horizontal plane and perpendicular to each other.

4. The test device for testing water tightness function of profiled components according to claim 3, being characterized in that, a mounting plate is embedded in the mounting seat, and the extending direction of the mounting plate is consistent with the extending direction of the mounting seat.

5. The test device for testing water tightness function of profiled components according to claim 1, being characterized in that, the carrier stage comprises:
a base which is provided with a connection portion protruding upward and an object stage for placing a component to be tested; and
a cover plate whose root portion is hinged to the connection portion, and the cover plate being provided with a relief hole passing through upper and lower surfaces thereof;
wherein the cover plate can reciprocally rotate in a vertical plane around the connection portion to selectively press the component to be tested placed on the object stage, and when the cover plate is pressed against the component to be tested placed on the object stage, the upper portion of the component to be tested can pass through the relief hole.

6. The test device for testing water tightness function of profiled components according to claim 5, being characterized in that, the object stage is provided with a receiving groove configured to receive the component to be tested, a detecting through hole extending in a vertical direction is provided at a bottom of the receiving groove, a probe is embedded in the detecting through hole, a sealing assembly is covered on the receiving groove, and the sealing assembly comprises:
a sealing plate; and
a top sealing ring disposed between the sealing plate and the object stage;
wherein the sealing plate is provided with a sealing through hole allowing the upper portion of the component to be tested to pass through, the top sealing ring is circumferentially disposed around the outer periphery of the receiving groove, and the sealing through hole communicates with the relief hole and the receiving groove, respectively.

7. The test device for testing water tightness function of profiled components according to claim 6, being characterized in that, a ring of a buffer ring which is elastically contacted with the component to be tested is provided at an inner side of the sealing through hole, and the sealing plate, the top sealing ring and the buffer ring are all integrally formed as a unified whole.

8. The test device for testing water tightness function of profiled components according to claim 5, being characterized in that, a pressing assembly for selectively pressing the cover plate is further provided at a side of the base, and the pressing assembly is disposed opposite to an end of the cover plate.

9. The test device for testing water tightness function of profiled components according to claim 8, being characterized in that, the pressing assembly comprises:
   a fixing seat;
   a rotating shaft whose root portion is rotatably connected with the fixing seat; and
   a pressing plate fixed to the top of the rotating shaft, wherein the pressing plate has an L-shaped structure.

10. The test device for testing water tightness function of profiled components according to claim 1, being characterized in that, the front end of the toggle lever extends downward to form a lower extension portion, and a toggle groove is provided at the lower surface of the lower extension portion.

* * * * *